(12) United States Patent
Imamovic et al.

(10) Patent No.: US 11,529,680 B2
(45) Date of Patent: Dec. 20, 2022

(54) DISTRIBUTOR DEVICE FOR A FILLING SHOE FOR COMPRESSION MOULDING

(71) Applicant: Höganäs AB (Publ), Höganäs (SE)

(72) Inventors: Ermin Imamovic, Höganäs (SE); Björn Johansson, Höganäs (SE)

(73) Assignee: HÖGANÄS AB (PUBL), Höganäs (SE)

( * ) Notice: Subject to any disclaimer, the term of this patent is extended or adjusted under 35 U.S.C. 154(b) by 250 days.

(21) Appl. No.: 16/464,161

(22) PCT Filed: Nov. 21, 2017

(86) PCT No.: PCT/EP2017/079921
§ 371 (c)(1),
(2) Date: May 24, 2019

(87) PCT Pub. No.: WO2018/095907
PCT Pub. Date: May 31, 2018

(65) Prior Publication Data
US 2019/0388965 A1    Dec. 26, 2019

(30) Foreign Application Priority Data

Nov. 25, 2016  (EP) ..................................... 16200623

(51) Int. Cl.
*B22F 3/00*       (2021.01)
*B22F 3/03*       (2006.01)
(Continued)

(52) U.S. Cl.
CPC ............... *B22F 3/004* (2013.01); *B22F 3/03* (2013.01); *B22F 2999/00* (2013.01);
(Continued)

(58) Field of Classification Search
CPC .... B22F 3/004; B22F 2999/00; B28B 13/022; B28B 13/023; B28B 13/026; B30B 15/304; B65B 1/06; B29C 2043/5875
See application file for complete search history.

(56) References Cited

U.S. PATENT DOCUMENTS 3,807,483 A  *  4/1974  Buhler ................... B22C 15/10
                                                        164/195
3,972,449 A     8/1976  Smith
(Continued)

FOREIGN PATENT DOCUMENTS

CN     1268416 A      10/2000
DE     10020954 A1    11/2000
(Continued)

OTHER PUBLICATIONS

International Search Report (Form PCT/ISA/210) dated Feb. 5, 2018, by the International Searching Authority in corresponding International Application No. PCT/EP2017/079921, 2 pages.
(Continued)

*Primary Examiner* — Anthony J Zimmer
*Assistant Examiner* — Jacob J Gusewelle
(74) *Attorney, Agent, or Firm* — Buchanan Ingersoll & Rooney P.C.

(57) ABSTRACT

A distributor device for use in a filling shoe for filling a mould cavity of a powder compression die, the distributor device having an inlet portion connectable to a powder supply; an outlet portion with an outlet opening; and a distributor portion arranged between the inlet portion and the outlet portion. The distributor portion includes one or more guide elements arranged to divide the distributor portion into a plurality of distributor channels. The distributor channels have an input with an input cross-sectional area at an upstream end of the distributor channel and an output with an output cross-sectional area at a downstream end of the distributor channel, wherein the input cross-sectional area differs from the output cross-sectional area for at least one of the distributor channels.

9 Claims, 4 Drawing Sheets

(51) Int. Cl.
    *B28B 13/02*       (2006.01)
    *B30B 15/30*       (2006.01)
    *B29C 43/58*       (2006.01)

(52) U.S. Cl.
    CPC ........... *B28B 13/022* (2013.01); *B28B 13/023* (2013.01); *B28B 13/026* (2013.01); *B29C 2043/5875* (2013.01); *B30B 15/304* (2013.01)

(56) References Cited

U.S. PATENT DOCUMENTS

| | | | |
|---|---|---|---|
| 6,321,800 B1 | 11/2001 | Ogawa et al. | |
| 2005/0089436 A1 | 4/2005 | Tokita | |
| 2007/0261759 A1* | 11/2007 | Douglass | B65B 1/06 141/114 |
| 2010/0320223 A1* | 12/2010 | Revirand | B28B 13/022 141/1 |

FOREIGN PATENT DOCUMENTS

| | | |
|---|---|---|
| EP | 1321260 A2 | 6/2003 |
| JP | H10264134 A | 10/1998 |
| WO | 0156726 A1 | 8/2001 |
| WO | 2008060229 A1 | 5/2008 |

OTHER PUBLICATIONS

Written Opinion (Form PCT/ISA/237) dated Feb. 5, 2018, by the European patent Office in corresponding International Application No. PCT/EP2017/079921, 6 pages.

Office Action (Text of First Office Action) dated Feb. 26, 2021 by the National Intellectual Property Administration, PRC in corresponding Chinese Patent Application No. 201780083619.5, and an English Translation of the Office Action. (9 pages).

* cited by examiner

DISTRIBUTOR DEVICE FOR A FILLING SHOE FOR COMPRESSION MOULDING

The present invention relates in one aspect to a filling shoe for filling a mould cavity of a powder compression die. More particularly, the present invention relates in one aspect to a distributor device for use in a filling shoe for filling a mould cavity of a powder compression die. According to a further aspect, the invention relates to a method of filling a mould cavity of a powder compression apparatus using a filling shoe.

BACKGROUND OF THE INVENTION

Powder forming processes, such as powder metallurgy, typically involve a compression moulding step, where a powder is filled into a die cavity and subsequently compacted under high pressure. The compression moulding step may be followed by a further heat treatment to produce the finished part. Such powder metallurgy processes may, for example, be used for producing magnetic core components for electrical machines, such as motors or generators and structural parts, such as for combustion engines. The finished components are usually subject to very high precision requirements regarding the tolerances for e.g. dimensions, planarity and density distribution within the finished component.

An even filling of the die cavity with powder during the compression moulding step plays a critical role for achieving such a high precision. Besides for the precision of the geometric dimensions and for the density distribution, a uniform distribution of the powder in the mould die during the filling step is particularly important for the production of large thin parts in order to prevent warping deformation during the heat treatment of the compacted green part. When producing magnetic items, the magnetic properties of the finished part may also be affected by an inhomogeneous distribution of the powder in the mould during the filling step. Other problems arising from a non-uniform distribution of the powder in the mould, due to an uneven filling during the filling step may include an increased risk of mechanical damage to the powder compaction tool during the compression step.

Traditional filling devices include one or more feed hoses supplying powder directly from a feed hopper to a filling shoe that is configured for a sliding to-and-fro movement to fill the mould die and to remove excess powder prior to compacting of the powder using punches. However, using a single hose may lead to an uneven filling exhibiting a maximum in the material thickness of the compacted green part corresponding to the location of the feed hose. Correspondingly, the use of a plurality of such feed hoses may result in multiple corresponding maxima or a correspondingly undulated material thickness after compaction.

Different techniques for improving the even distribution of the powder in the mould die during the filling step have been proposed in the art. These techniques include fluidizing the powder during the filling step by the application of a gas flow through a permeable plate placed in the filling device for a powder compaction apparatus (see e.g. WO 2001/056726), moving meshes arranged in the filling flow (see e.g. U.S. Pat. No. 3,972,449), or a fixed mesh placed in the outlet flow channel of a filling shoe device (see e.g. WO 2008/060229). A powder feeding apparatus for use in a powder pressing apparatus is furthermore disclosed in U.S. Pat. No. 6,321,800 B1. The disclosed apparatus involves a complex filling procedure multiple steps, including the weighing and proper apportionment of powder charges to respective cavities of a powder compaction apparatus with multiple cavities. An inhomogeneous distribution of the powder charges within each of the cavities is addressed with a vibrational stage for agitating the powder flow during filling. The vibrational stage has many moving parts that require maintenance and repair. Thus, these approaches typically suffer from different disadvantages, such as a complex apparatus design, involve delicate moveable parts, or still tend to yield unreliable and/or unsatisfactory production results.

Therefore there is a need for a simplified device for the filling the mould cavity of a die in a powder compression apparatus for achieving improved filling results, and in particular for ensuring uniform filling of the mould cavity of a die in a powder compression apparatus.

In one aspect, an object of the present invention is therefore to provide such a filling device for achieving improved filling results, overcoming at least some of the disadvantages of prior art devices, or at least providing an alternative.

In a further aspect, an object of the present invention is to provide a filling method for achieving improved filling results, overcoming at least some of the disadvantages of corresponding prior art methods, or at least providing an alternative.

SUMMARY OF THE INVENTION

According to one aspect, the object of the present invention is solved by a distributor device according to the attached claims with advantageous embodiments as defined by the corresponding dependent claims and the following description. According to a further aspect, the object of the present invention is solved by a powder filling method according to the attached claims with advantageous embodiments as defined by the corresponding dependent claims and the following description.

A first aspect of the invention thus relates to a distributor device for use in a filling shoe for filling a mould cavity of a powder compression die, the distributor device having an inlet portion connectable to a powder supply; an outlet portion with an outlet opening, optionally comprising separation walls to form a plurality of outlet channels abutting each other; and a distributor portion arranged between the inlet portion and the outlet portion; wherein the distributor portion comprises one or more guide elements arranged to divide the distributor portion into a plurality of distributor channels, each distributor channel having an input with an input cross-sectional area at an upstream end of the distributor channel and an output with an output cross-sectional area at a downstream end of the distributor channel, wherein the input cross-sectional area differs from the output cross-sectional area for at least one of the distributor channels.

The distributor device provides a direct powder flow connection from the powder supply to the filling shoe outlet while redistributing the powder "on the flow" to obtain a desired powder flow distribution at the outlet for discharging into the mould cavity to be filled. The direct, yet precisely distributed powder flow achieved by the present invention allows for an efficient high throughput production and avoids, or at least reduces, the need for tedious powder charge preparation procedures in several steps—without compromising on the quality of the end product. Furthermore, the distributor device is operated as a passive device, where the positions of the guiding elements at least during a given filling task remain fixed. As further discussed below, the configuration of the guide elements may nevertheless be adjustable, e.g. in order to facilitate an easy fine tuning of the powder flow at the outlet to a desired distribution, or in order to even completely re-arrange the guide elements in the distributor device for a new filling task.

In particular, a first aspect of the invention thus relates to a distributor device for use in a filling shoe for filling a mould cavity of a powder compression die, the distributor device comprising a housing adapted to direct a powder flow from a powder supply to an outlet of the filling shoe for discharge into the mould cavity, the housing comprising an inlet portion connectable to a powder supply; an outlet portion with an outlet opening, optionally comprising separation walls to form a plurality of outlet channels abutting each other; and a distributor portion arranged between the inlet portion and the outlet portion; wherein the distributor portion comprises one or more guide elements arranged to divide the distributor portion into a plurality of distributor channels, each distributor channel having an input with an input cross-sectional area at an upstream end of the distributor channel and an output with an output cross-sectional area at a downstream end of the distributor channel, wherein the input cross-sectional area differs from the output cross-sectional area for at least one of the distributor channels.

The distributor device receives a powder flow at the inlet portion from a supply line connected to its inlet and leads that powder flow to the outlet opening of the outlet portion, from where the distributor device discharges the powder into the mould cavity. The outlet opening of the distributor device is typically arranged at the outlet of the filling shoe. The distributor device has a housing that forms a conduit defined by peripheral walls. The distributor device housing is adapted to confine and direct the powder flow on its way from the inlet to the outlet of the distributor device. The distributor device housing may have any cross-sectional shape suited for confining and directing the powder flow from the inlet to the outlet. According to some embodiments, the distributor device housing may have a box shaped cross-section as seen in an axial direction along an average direction of the overall powder flow carried by the distributor device: in a vertical direction perpendicular to the axial direction the box-shaped cross-section is defined by a top wall and a bottom wall opposite of the top wall; and in a horizontal direction perpendicular to the axial and vertical directions the box-shaped cross-section is defined by a first side wall and a second side wall opposite of the first side wall. According to some configurations, the top and bottom walls are essentially plane and/or parallel to each other. Further according to some embodiments, the first and second side walls are plane and/or parallel to each other. Further according to alternative embodiments, the first and second side walls of the distributor device housing may be diverging in a direction from the inlet to the outlet. So as to expand the total cross-sectional area in the general direction of the powder flow from the inlet to the outlet. This is particularly advantageous where the distributor device is fed from a powder supply line with a cross-sectional area that is less than the width of the mould cavity to be filled and the width of the powder flow at the outlet opening is to be matched with the width of the mould cavity. A further advantage of expanding peripheral walls may be a reduced risk of jamming of the powder flow in the distributor device at high feed flow rates, thereby increasing the production throughput.

The distributor device comprises a distributor portion extending from the inlet portion to the outlet portion. The distributor portion comprises guide elements arranged to divide a powder flow received from the inlet portion into a plurality of sub-flows and to guide said plurality of sub-flows to the outlet opening. Non-limiting examples of suitable guide elements are division walls, baffles, deflector plates, or the like. The inlet communicates with the outlet through the distributor portion so as to sustain a powder flow in an axial direction from the inlet to the outlet. The axial direction of a powder flow or sub-flow may be defined with respect to that flow as the average direction of the flow as integrated over the entire mass flow distribution. In a purely geometrical definition, referring to the distributor device housing having an inlet at the inlet portion and an outlet opening of the outlet portion, the axial direction of the distributor device may be defined as the direction from a centre point in the inlet to a centre point in the outlet opening. Dimensions along the axial direction may be referred to as length, or lengthwise in respect of the distributor device. Correspondingly, in a geometrical definition of the axial direction when referring to a channel having an input and an output, the axial direction of the channel may be defined as the direction from a centre point in the inlet to a centre point in the outlet opening. For curvy or bent geometries following a curved centre line from an inlet/input to an outlet/output, the axial direction at each point of the centre line is the tangent to that centre line in that point. Transverse directions are perpendicular to the respective axial direction. A first transverse direction is referred to as the horizontal direction, wherein the term 'width' refers to dimensions in the horizontal direction. A second transverse direction is referred to as the vertical direction, wherein horizontal and vertical directions are perpendicular to each other. The term 'height' refers to dimensions in the vertical direction.

The term 'mass flux' of a powder flow or sub-flow as used herein is defined as the mass flow rate of that powder flow or sub-flow divided by the cross-sectional area of the powder flow or sub-flow, respectively. The mass flux may thus be considered as the areal density of mass flow rate. Variations in the mass flux in transverse directions perpendicular to an axial direction of the flow may be described by a cross-sectional mass flux distribution or short mass flux distribution. The variations may e.g. reflect increased friction at boundaries confining the flow or fringe effects of an expanding flow. The variations may thus lead to a non-uniform mass flux distribution of the powder flow or sub-flow. Variations may also occur in the mass flux between channels guiding respective sub-flows and will equally lead to a non-uniform mass flux distribution at the point where the sub-flows of the uneven channels are reunited.

The one or more guide elements provide for internal division of the conduit formed by the distributor device housing and thus define a plurality of distributor channels. The guide elements are adapted to at least divide the powder flow passed through the distributor device into sub-flows. The guide elements may further be arranged to deflect these sub-flows so as redistribute the mass flux of the powder flow on its way from the inlet portion to the outlet portion. Advantageously, the guide elements may be arranged to expand a transverse extension of at least one of the sub-flows along the direction of powder flow so as to reduce the mass flux of said at least one sub-flow at the outlet portion with respect to the mass flux of said at least one sub-flow at the inlet portion and/or the guide elements may be arranged to narrow a transverse extension of at least one of the sub-flows along the direction of powder flow so as to increase the mass flux of said at least one sub-flow at the outlet portion with respect to the mass flux of said at least one sub-flow at the inlet portion. This may be achieved by a distributor channel carrying the sub-flow, which has an output cross-sectional area that is different from the input cross-sectional area, thereby changing the mass flux of this sub-flow at the output of the distributor channel as compared to the mass flux of this sub-flow at the input of the distributor channel. The guide elements may thus be adapted for redistributing the mass flux of the powder flow over the width of the outlet opening. In particular, the guiding elements can be configured to re-distribute the mass flux so as to transform a given inlet mass flux distribution received at the upstream end of the distributor portion into a desired mass flux distribution at the downstream end of the distributor portion and thus to eventually obtain a desired target mass flux distribution at the outlet opening of the distributor device, and thus at the outlet of the filling shoe in which the distributor device is used.

Usually, a uniform mass flux distribution is desired at the outlet of the distributor device, and may be achieved to a good approximation within tolerances determined by a given powder filling task. The powder filling task may e.g. be determined by the shape of the mould cavity and a required precision for the thickness uniformity of the compressed green part produced from the powder charge.

In principle, however, it may be conceived that a non-uniform target mass flux distribution at the outlet opening could be desired for specialized filling tasks. Such a non-uniform target mass flux distribution may equally be obtained by adjusting the guide elements of the distributor portion accordingly such that a given inlet mass flux distribution is transformed to the desired target mass flux distribution at the outlet opening.

Further according to some embodiments of the distributor device, the distributor channels are disposed in a cascaded arrangement of consecutive stages. The outputs of the distributor channels of a first stage are interfaced with the inputs of a second, consecutive stage arranged downstream thereof. The distributor channels of subsequent stages may be displaced in a transverse direction with respect to each other such that the outputs of an upstream stage are further divided and/or merged partial flows by the inputs of a consecutive stage. The guiding elements forming the cascaded arrangement of distributor channels are also arranged so as to re-distribute the mass flux to obtain a desired target mass flux distribution at the downstream end of the distributor portion. The advantages of disposing the distributor channels in multiple consecutive stages include: refining the mass flux distribution to come closer to a desired target mass flux distribution, e.g. improving the uniformity of a mass flux-distribution provided at the outlet opening for filling into the mould cavity; and/or collecting and buffering a mass flux distribution prepared by an upstream stage and essentially transfer that mass flux distribution via a downstream stage to the outlet portion for discharge through the outlet opening into the mould cavity with a well-defined distribution of the powder pressure over the cross-section of the output opening, thereby achieving an improved filling result.

Further according to some embodiments of the distributor device, the guide elements are arranged to define a first stage with a first number of N parallel distributor channels and a consecutive second stage with a second number of M parallel distributor channels arranged downstream of the first stage, wherein the first number N is different from the second number M. Thereby an improved mass flow exchange and re-distribution between adjacent channels is achieved. This allows for smoothening out, equalizing and/or adjusting for variations in mass flux between sub-flows in adjacent channels to reduce deviations from a desired target mass flux distribution, such as for obtaining a particularly uniform filling result.

Further according to some embodiments of the distributor device, each distributor channel has an input/output ratio defined as the input cross-sectional area divided by the output cross-sectional area, wherein the input/output ratio for at least one of the distributor channels differs from the input/output ratio of one or more of the remaining distributor channels.

In the distribution channels, an input mass flux is the mass flow rate of the sub-flow fed to the input of a distribution channel divided by the input cross-sectional area. Analogue thereto, output mass flux is the mass flow rate (at the output) divided by the output cross-sectional area. Under steady conditions, the mass flow rate at the input and at the output of a given distributor channel are the same. By varying the cross-sectional areas of input and/or output the mass flux may thus be varied, and may thus be configured. This allows for re-distributing the mass flux of the powder flow as it is passed through the distributor portion. Thereby, a mass flux distribution at the input of the distributor channels may is transformed to a desired mass flux distribution at the output of the distributor channels prerequisite to a desired filling result. For example, an uneven mass flux distribution as provided by an inlet flow from a power supply under operational conditions may be spread over the full width of the output opening and re-distributed so as to reduce the variations across the outlet opening, thereby improving the uniformity of the mass flux distribution of the powder flow at the outlet of the distributor device, an in particular improving the uniformity of a powder pressure distribution across the outlet opening. In the above-mentioned special case, on the other hand, where a non-uniform mass flux may be desired, the required transformation and re-distribution may conceivably include increasing differences in output mass flux between different distributor channel outputs as compared to the differences in input mass flux at the corresponding inputs.

Adaptations may be done according to simulations or empirically starting with an educated guess for a default configuration, e.g. according to the fraction of the cross-section of the inlet powder flow seen by the respective channels at their input ends and proportionally adjusting the input cross-section to output cross-section ratio to achieve a first approximation of the desired mass flow correction/equalization. For a particular powder compression apparatus/set-up the input/output ratios may further be corrected to achieve a desired filling result by assessing the achieved result for a given inlet powder flow and adjust the input/output ratios to compensate for deviations from target. In case the output mass flux of a given distributor channel is larger than desired, e.g. larger than that of an adjacent distributor channel, the output cross-section of this given channel should be widened with respect to or at the expense of the neighbouring channel. Correspondingly, in case the output mass flux of a given distributor channel is smaller than desired, the output cross-section of this given channel should be narrowed with respect to or at the expense of any neighbouring channels. Alternatively or in addition thereto the input cross-sections of the respective distributor channels may be varied to achieve the desired equalization/redistribution of the powder flow.

For a given powder flow at the inlet portion, the input/output ratios of parallel distributor channels carrying parallel sub-flows are configured with respect to each other so as to model a pre-determined target mass flux distribution at the outputs of the distributor channels—and eventually at the outlet opening of the distributor device. Typically, the target mass flux distribution is a uniform and the distributor channels are configured with input/output ratios so as to reduce, or even eliminate, any differences in output mass flux between the respective distributor channel outputs. In particular, by adjusting the input/output ratios of the distributor channels with respect to each other, an even distribution of the powder pressure across the outlet opening may be achieved leading to a uniform filling of the mould cavity.

The skilled person can, for example, determine a given powder flow at the inlet portion of a given set-up by requiring a particular configuration of the powder supply and/or the inlet portion, and further requiring a particular total powder mass flow corresponding to typical values under operational conditions of the powder compression apparatus. For example, the inlet portion may be designed with one or more inlet ports connected to an upstream end of the distributor device, wherein the one or more inlet ports are connected to a powder feed hopper via respective hoses/tubes/pipes. Assuming a certain powder throughput corresponding to typical operational parameters of the powder compression apparatus, a particular design of the powder supply and inlet configuration will result in a particular, usually non-uniform, input mass flux distribution at an upstream end of the distributor portion. Alternatively, the skilled person may assume or simulate beforehand an inlet powder flow with a given mass flux distribution as seen in a cross-section perpendicular to a direction of the mass flow of the powder. The assumed or simulated inlet powder flow then determines an input mass flux distribution at the upstream end of the distributor portion. As a result of the given powder flow at the inlet, each of the sub-flows defined by the guiding elements has a respective mass flow. Each sub-flow has a cross-sectional area as seen in a direction perpendicular to a direction of the mass flow of said sub-flow. The corresponding (average) mass flux of the sub-flow can be determined as the mass flow rate of the sub-flow divided by the cross-sectional area at a given point along the direction of the sub-flow. Accordingly, each distributor channel has, for a given powder flow at the inlet portion, a respective mass flow, wherein an input mass flux can be defined as the mass flow divided by the input cross-sectional area of the distributor channel and an output mass flux can be defined as the mass flow divided by the output cross-sectional area of the distributor channel.

For a given powder flow at the inlet portion and a given arrangement of the guide elements, the skilled person can then determine the mass flux distribution obtained at the outlet opening of the distributor device, compare that mass flux distribution with a target mass flux distribution, and, if necessary, correct deviations by rearranging the guiding elements.

Advantageously according to some embodiments, the configuration of the guide elements is adjustable. Thereby an easy fine tuning of the powder flow at the outlet to a desired distribution, or a re-arrangement of the guide elements in the distributor device for a new filling task is facilitated, thereby further adding to the powder compression production precision achievable when using the distributor device and further adding to the versatility of the distributor device for multiple different filling tasks, e.g. to reduce tooling costs.

Here it may again be noted that the actual object is to improve the precision of the filling charge delivered to the mould cavity, which eventually is reflected in an improved precision of the green part produced by the compression apparatus—matching target specifications in terms of e.g. thickness variation tolerances, density distribution uniformity, homogeneity, and/or mechanical stability. In practice, the skilled person is therefore typically not required to explicitly determine the actual mass flux distribution obtained at the outlet of the filling shoe, at the outlet opening of the distributor device, or for that sake at any intermediate stage within the filling shoe in order to derive the required adjustments to the input/output ratios. Instead, the skilled person may determine local deviations by analysing the filling result, or preferably directly by analysing the compressed green part obtained from the powder compression process, e.g. by measuring thickness variations across the green part, and/or by comparing a thickness measured at different locations of the compressed green part to target specifications. Any local variations and/or deviations thus determined with spatial resolution across the green part may then be attributed to corresponding locations/regions on the distributor device outlet opening, and linked back to corresponding channels supplying these locations/regions. By adjusting the input/output ratios of the corresponding distributor channels, the variations and/or deviations of the compressed green part may then directly be corrected for.

Further according to some embodiments, the distributor device further comprises one or more distribution ducts, each distribution duct being connected to receive powder from a plurality of distributor channels upstream thereof and to distribute the collected powder to a plurality of channels downstream thereof.

The distribution duct is typically arranged transverse of the distributor channels. The distribution duct communicates with a plurality of parallel distributor channels upstream thereof and further communicates with a plurality of channels downstream thereof. The distribution duct allows for a re-distribution of powder between adjacent sub-flows. The transverse distribution duct forms a reservoir collecting powder from the outputs of the plurality of upstream distributor channels and distributes the collected powder to the inputs of the downstream channels. The transverse distribution duct thus forms a manifold and may be considered to act as a buffer volume or plenum for the equal distribution of the powder collected from the upstream channels to a plurality of downstream channels, which then deliver the powder to the outlet opening. A particular advantage of this transversely arranged distribution duct is that it allows for equalizing a distribution of the powder pressure across the outlet opening, thereby improving the uniformity of the powder charge in the mould cavity. Further advantageous embodiments are discussed in the following.

Further according to some embodiments of the distributor device, at least one distribution duct is arranged between a first stage of the distributor portion and a second stage of the distributor portion. More particularly, the distribution duct is arranged between the downstream end of a first stage of the distributor portion and the upstream end of a second stage of the distributor portion. The distribution duct may thus act as a distributed buffer reservoir separating the downstream end of the first distributor stage from the upstream end of the consecutive second distributor stage. The buffer volume ensures an equalized, reliable, and adequate supply of powder to all downstream channels. Thereby, a reliable distribution of the powder over the outlet opening, and consequently a reliable filling result is achieved.

Further according to some embodiments of the distributor device, the distributor channels of the second stage have equal length and/or equal input/output ratio, wherein the term equal is to be understood to within typical tolerances, such as within 20%, within 10%, within 5%, or even within 2% of the average value of the respective parameter. As a special case of equal input/output ratios, the respective second stage distributor channels have the same input and output cross-sectional areas the same. As a further special case, the cross-sectional area is constant along the respective channels. These embodiments are particularly useful in combination with a first stage configured to provide an essentially uniform mass flux distribution at the downstream end thereof. Even further advantageously, these embodiments are combined with a distribution duct acting as a distributed buffer reservoir for collecting a uniformly distributed mass flow from the first stage, and ensure an adequate and reliable, uniformly distributed supply of powder to the input ends of the second stage channels.

The second stage according to these embodiments transfers a uniform mass flux distribution defined at the input/upstream end of the second stage to a corresponding uniform mass flux distribution at the output/downstream end of the second stage. The uniform (or close to uniform) mass flux distribution is then provided to the outlet portion. Under typical operational conditions, the second stage channels are filled up during the filling procedure. Thereby an essentially uniform distribution of the powder pressure across the outlet opening is achieved, leading to a uniform filling of the mould die, which in turn results in an improved precision for the thickness uniformity of the compressed green part.

Further according to some embodiments of the distributor device, at least one distribution duct is arranged between (the downstream end of) the distributor portion and (the upstream end of) the outlet portion. More particularly, the at least one distribution duct is arranged between the downstream end of the distributor portion and the upstream end of the outlet portion. These embodiments are particularly useful in combination with an outlet portion comprising separation walls dividing the outlet opening into parallel outlet channels. The distribution duct may thus act as a distributed buffer reservoir separating the downstream end of the distributor portion from the upstream end of the outlet portion. The buffer volume ensures an equalized, reliable, and adequate supply of powder to the outlet portion and in particular to any channels in the outlet portion. Thereby, a reliable distribution of the powder over the outlet opening, and consequently a reliable filling result is achieved.

Most preferably, according to some embodiments of the distributor device, the outlet opening has a width that is equal or larger than the mould cavity to be filled. Thereby, the above mentioned advantages of matching a target powder mass flux distribution at the outlet opening, and in particular of a uniform and well-controlled distribution of the powder pressure across the outlet opening, are achieved over the entire width of the mould cavity. Thereby fringe effects at the edges of the mould cavity are avoided.

Further according to some embodiments of the distributor device, the outlet portion further comprises separation walls dividing the outlet opening into outlet channels. Thereby it is achieved that a (uniform) mass flux distribution may as established by the distributor portion may reliably be provided at the outlet opening.

Typical transverse dimensions of the outlet channels may be in the range of a few centimetres, such as at least 1 cm, or at least 2 cm, or at least 3 cm, and up to 6 cm, or up to 8 cm, or up to 10 cm. However, transverse dimensions of the outlet channels in the range of a few millimetres may be conceived, such as at least 1 mm, or at least 2 mm, or at least 3 mm, and up to 6 mm, or up to 8 mm, or up to 10 mm.

Advantageously according to some embodiments, the separation walls are equally spaced.

Most preferably, the outlet channels are tightly abutting each other in order to avoid shadow effects that would spoil the uniform distribution of the powder flow across the outlet opening and jeopardize the filling result.

Advantageously, a minimum number O of abutting outlet channels is defined by the separation walls, wherein the minimum number O is at least 5, such as 10, or 15, or 20.

Further according to some embodiments of the distributor device, the total cross-sectional area of the outlet opening is larger than the total cross-sectional area of the inlet. The inlet of the housing of the distributor device receives an inlet powder flow from the powder supply and directs the powder flow to the outlet opening at the outlet of the filing shoe. As discussed above, the risk of jamming of the powder flow is considerably reduced by requiring that the total cross-sectional area of the outlet opening is at least the same, and most preferably larger than the total cross-sectional area of the outlet opening. This is of particular relevance for high powder flow rates for high throughput production.

A second aspect of the invention relates to a method of filling a mould cavity of a powder compression apparatus, whereby analogue advantages are achieved as discussed above with respect to the distributor device.

A second aspect of the invention relates to a method of filling a mould cavity of a powder compression apparatus by means of a filling shoe with a distributor device having an inlet portion connectable to a powder supply, an outlet portion having an outlet opening, and a distributor portion connecting the inlet portion to the outlet portion, the method comprising: providing an inlet powder flow having an inlet mass flux distribution; dividing the inlet powder flow into parallel sub-flows and guiding the sub-flows from the inlet portion to the outlet portion by means of guide elements, each sub-flow having a mass flow determined by the inlet mass flux distribution, an input cross-sectional area at an upstream end and an output-cross-sectional area at a downstream end; for at least one of the sub-flows, increasing, and/or decreasing the output cross-sectional area with respect to the input cross-sectional area of said sub-flow.

In particular, a second aspect of the invention relates to a method of filling a mould cavity of a powder compression apparatus by means of a filling shoe with a distributor device comprising a housing adapted to direct a powder flow from a powder supply to an outlet of the filling shoe for discharge into the mould cavity, the housing comprising an inlet portion connectable to the powder supply, an outlet portion having an outlet opening arranged at the outlet of the filling shoe, and a distributor portion connecting the inlet portion to the outlet portion, the method comprising: receiving a powder flow from the powder supply at the inlet portion, thereby providing an inlet powder flow having an inlet mass flux distribution; dividing the inlet powder flow into parallel sub-flows and guiding the sub-flows from the inlet portion to the outlet portion by means of guide elements, each sub-flow having a mass flow determined by the inlet mass flux distribution, an input cross-sectional area at an upstream end and an output-cross-sectional area at a downstream end; for at least one of the sub-flows, increasing, and/or decreasing the output cross-sectional area with respect to the input cross-sectional area of said sub-flow.

Thereby, a mass flux distribution of the powder flow may be modelled to match a target mass flux distribution across the width of the outlet opening. In particular, a desired distribution of the powder pressure across the outlet opening may be achieved. Typically, the desired powder pressure distribution is uniform across the outlet opening.

Further according to some embodiments of the method, a first set of sub-flows has a first number of N parallel sub-flows and a consecutive set of sub-flows downstream of the first set of sub-flows has a second number of M parallel sub-flows, wherein the first number N is different from the second number M.

Further according to some embodiments of the method, each sub-flow has an input/output quotient defined as an input cross-sectional area of the sub-flow at an upstream end thereof divided by an output cross-sectional area of the sub-flow at a downstream end thereof, wherein the input/output quotient for at least one of the sub-flows differs from the input/output quotient of one or more of the remaining sub-flows. The input/output quotient and the quantities defining it is analogue to the geometrically defined input/output ratio of the distributor channels.

Further according to some embodiments, the method further comprises: collecting powder from the output of a first set of parallel sub-flows in a buffer volume; redistributing the collected powder from the buffer volume to the inputs of a second set of parallel sub-flows; and providing the output of the second set of parallel sub-flows to the outlet portion. The buffer volume is analogue to the above-mentioned distribution duct acting as a reservoir for collecting powder from channels upstream thereof and feeding the collected powder to channels downstream thereof.

Further according to some embodiments of the method, the second sub-flows have equal lengths.

BRIEF DESCRIPTION OF THE DRAWINGS

Preferred embodiments of the invention will be described in more detail in connection with the appended drawings, which show schematically in FIG. 1 a cross-sectional side view of a powder compression apparatus with a filling shoe including a distributor device according to one embodiment, FIGS. 2A-2C a distributor device according to a first embodiment in a top view (A), a side view (B), and an end view (C) as seen from the outlet end, FIG. 3 a top view of a distributor device according to a second embodiment, and in FIG. 4 a top view of a distributor device according to a third embodiment.

DETAILED DESCRIPTION OF PREFERRED EMBODIMENTS

Figure 1:
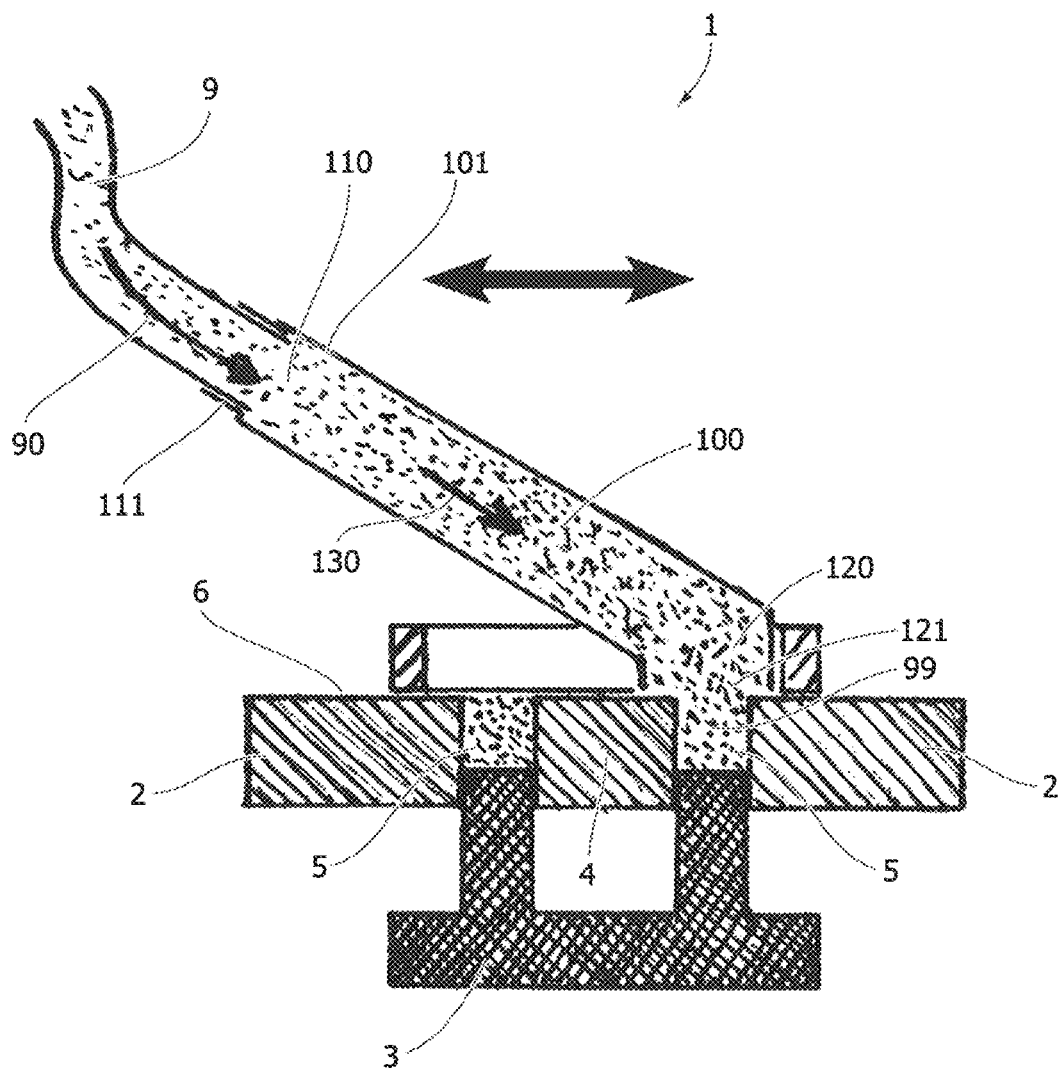

FIG. 1 shows a powder compression apparatus for producing compressed green parts from a powder charge that is filled into a mould cavity of a compression die and subsequently compressed. The powder compression apparatus 1 has a powder compression die 2, and e.g. a bottom punch 3 and a core part 4 together defining a mould cavity 5 that delineates the shape of the green part to be formed. The apparatus is further equipped with a filling shoe including a distributor device 100 for filling the mould cavity 5 of the powder compression die 2 with a powder charge 99. The distributor device 100 has at a distal end an inlet portion 110, at a proximal end an outlet portion 120, and a distributor portion 130 arranged between the inlet and outlet portions 110, 120. An inlet 111 at the inlet portion 110 receives a powder flow 90 from a powder supply, such as a powder hopper (not shown) via a tube 9. A housing 101 of the distributor device 100 forms a conduit confining and directing the powder flow from the inlet 111 via the inlet portion 110 via the distributor portion 130 to the outlet portion 120, from where a powder charge 99 is delivered to the mould cavity 5 through an outlet opening 121 arranged at the proximal end of the outlet portion 120 so as to face an upper surface 6 of the powder compression die 2. The filling shoe with the distributor device 100 is adapted to perform a sliding to-and-fro movement along the upper surface 6 of the powder compression die 2 as indicated by the double block arrow. The to-and-fro movement covers the entire extension of the mould cavity 5 so as to ensure filling of all parts of the cavity 5, wherein the distributor portion 130 of the distributor device 100 at the interface between the outlet opening 121 and the upper surface 6 of the compression die 2 ensures a powder pressure that is uniformly distributed across the outlet opening 121. Thereby a uniformly distributed powder charge 99 filling the mould cavity 5 is obtained.

Figure 2A:
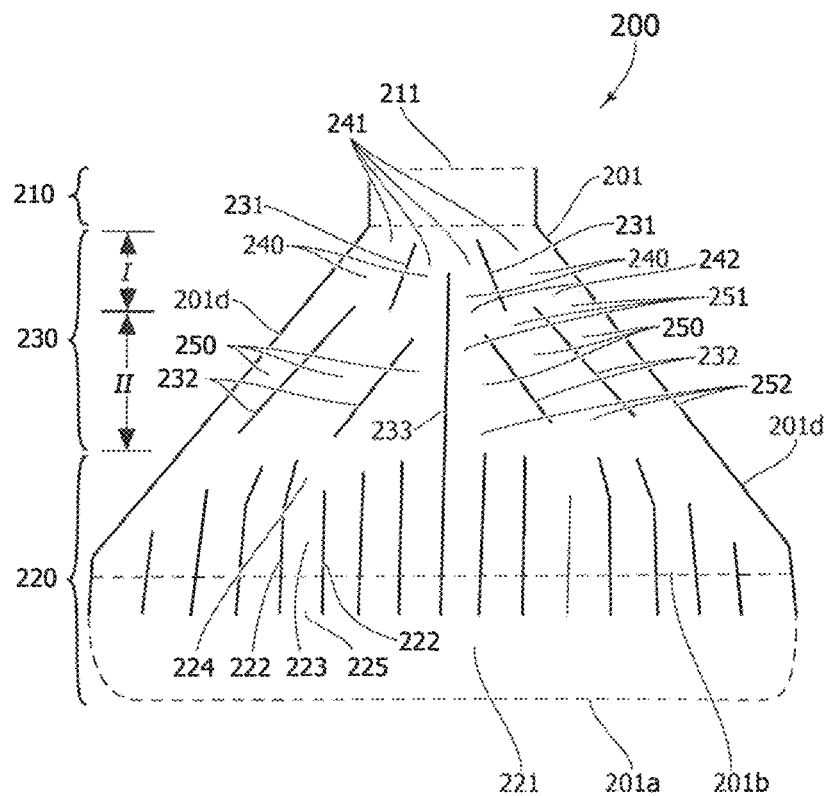
Figure 2B:
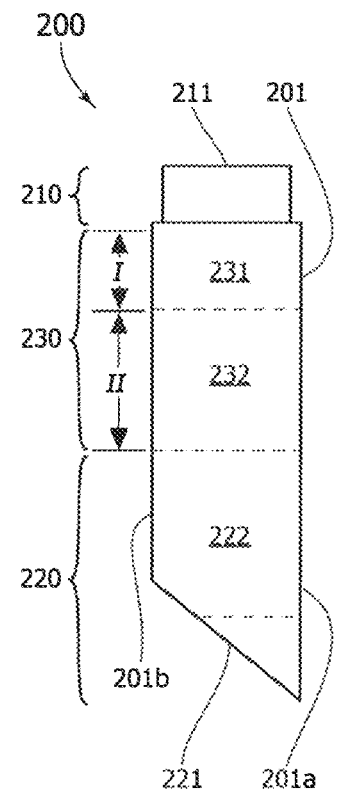
Figure 2C:
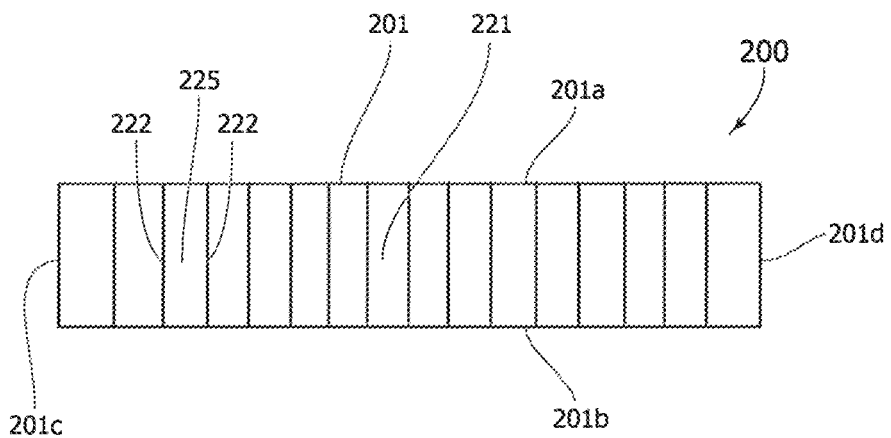

FIGS. 2A, 2B, and 2C show three different views of a first embodiment of a distributor device 200: a top elevation (FIG. 2A); a side elevation (FIG. 2B); and an end elevation (FIG. 2C) as seen from a proximal end of the distributor device 200. The distributor device 200 has an inlet portion 210 with an inlet 211 at a distal end of the distributor device 200, an outlet portion 220 with an outlet opening 221 at a proximal end of the distributor device 200, and a distributor portion 230 arranged between the inlet portion 210 and the outlet portion 220. The inlet portion 210 of the distributor device 200 is connectable to a powder supply tube for receiving a powder flow through a single inlet 211. Under operation, the powder flow is passed from the inlet portion 210 through the distributor portion 230 to the outlet portion 220 from where it is discharged through outlet opening 221 for delivery to a mould cavity of a powder compression die. The distributor device 200 has a box-shaped housing 201 having in a vertical direction a top wall 201a, a bottom wall 201b opposite of the top wall 201a (best seen in FIGS. 2B and 2C), and, in a horizontal direction, a first side wall 201c and a second side wall 201d opposite of the first side wall 201c (best seen in FIGS. 2A and 2B). The top and bottom walls 201a, 201b are essentially parallel to each other, here spaced apart from each other with a height essentially matching the height of the inlet 211. The first and second side walls 201c, 201d are arranged at an angle with respect to each other so as to diverge in a direction from the inlet 211 to the outlet 221. The outlet opening 221 has a width which determines the width of a mould cavity that can reliable be filled by a filling shoe including the distributor device 200, i.e. the width of the outlet opening 221 matches or surpasses the width of a cavity to be filled.

The distributor portion 230 has a plurality of guide elements 231, 232 forming distributor channels 240, 250, each distributor channel 240, 250 having an input 241, 251 with a corresponding input cross-sectional area and an output 242, 252 with a corresponding cross-sectional area. The top view of FIG. 2A best illustrates the arrangement of the guide elements 231, 232 in the distributor portion 230. The guide elements 231, 232 are arranged in a cascading arrangement of consecutive stages I, II with a first stage I of guide elements 231 forming first distributor channels 240 at an upstream end of the distributor portion 230, and a second stage II of guide elements 232 forming second distributor channels 242 downstream stream of the first stage I and extending to the downstream end of the distributor portion 230. Thereby, a uniform distribution of the powder flow across the entire width of the distributor device is achieved, which may then be passed on to the outlet portion 220.

The outlet portion 220 comprises separation walls 222 dividing the outlet opening 221 in a plurality of outlet channels 223 closely abutting each other in a horizontal direction, as best seen in FIGS. 2A and 2C. The outlet channels 223 each have an input 224 arranged to receive powder from distributor portion 230, and an output 225 arranged to deliver the powder at the outlet opening 221.

As mentioned above, the distributor device 200 shown in FIG. 2 has a diverging geometry expanding from a narrow inlet 211 adapted to the width of a powder supply tube, to a wide outlet opening 221 matching or surpassing the width of a die cavity to be filled. The diverging geometry of the housing 201 allows the powder flow to expand in a direction transverse of the average direction of the flow. The guide elements 231, 232 of the distributor portion 230 are also arranged in a fan-out arrangement dividing the incoming powder flow into expanding sub-flows and deflecting the sub-flows so as to redistribute a narrow mass flux received from the inlet portion 210 to obtain at the outlet portion 220 an essentially uniform distribution of the mass flux over the full width of the distributor device conduit 201. The distributor device 200 is symmetric with respect to a centre line and may therefore advantageously have a guide element formed as a central division wall 233 dividing the incoming powder flow into two preferably equal halves, each of which are then redistributed by a corresponding set of guide elements 231, 232 arranged in two consecutive stages I, II as discussed above. In particular, the guide elements 231, 232 of the distributor portion 230 form expanding channels where an output cross-sectional area is larger than the input cross-sectional area. However, the input/output ratios of the distributor channels 231 within the first stage I are not equal to each other. Also the input/output ratios of the distributor channels 232 within the second stage II are not equal to each other. The input/output ratio of a channel is defined as the input cross-sectional area divided by the output cross-sectional area of the channel. A closer look at the first and second stage channels reveals that the distribution channels closer to the centre have a smaller input/output ratio as compared to those towards the edges. This configuration compensates for the fact that a central fraction of the powder flow received at the inlet, e.g. through a tube of essentially circular cross-section, carries a larger amount of powder than edge fractions towards the sides of the distributor device housing 201. The larger mass flux at the centre is therefore expanded more than the mass flux at the sides, thereby redistributing the mass flux in a transverse (horizontal) direction of the distributor device conduit 201 so as to equalize the powder flow in a transverse (horizontal) direction. The first stage of the particular embodiment shown in FIG. 2 contains two guide elements 231, which in combination with the housing walls 201a-201d and the central division wall 233 form four first stage distributor channels 240 with an input 241 at the inlet portion 210, and an output 242 downstream thereof. The second stage counts four guide elements 232, which, in combination with the housing walls 201a-201d and the central division wall 233, form six second stage distributor channels 250 with inputs 251 arranged immediately at the outputs 242 of the first stage distributor channels 240. Also the second stage channels have an input/output ratio that decreases towards the centre so as to spread out an excessive central mass flow. The equalized powder flow is then presented at the outlet portion 220.

The output of the distributor portion 230 is fed to the inputs 224 of the outlet channels 223 as a steady and uniformly distributed supply of powder, which is then transferred to the outputs 225 of the outlet channels 223 at the outlet opening 221 as an essentially uniform distribution of the powder pressure as provided across the entire width of the output opening 221. Thereby the uniformity of the powder charge delivered to the mould cavity is improved as compared to prior art techniques (see also example below). Consequently, an improved uniformity of the compressed green part produced by the powder compression process is achieved. Eventually an improved uniformity of a heat treated part produced from the green part is thus achieved when using a filling shoe with a distributor device according to the invention for filling a mould cavity of a powder compression die. The particular embodiment shown in FIG. 2 has fourteen essentially equally spaced separation walls 222, which in combination with the housing walls 201a-d and the central division wall 233 form sixteen outlet channels 223 with an input 224 at the output of the distributor portion 230, and an output 225 downstream thereof at the outlet opening 221.

Figure 3:
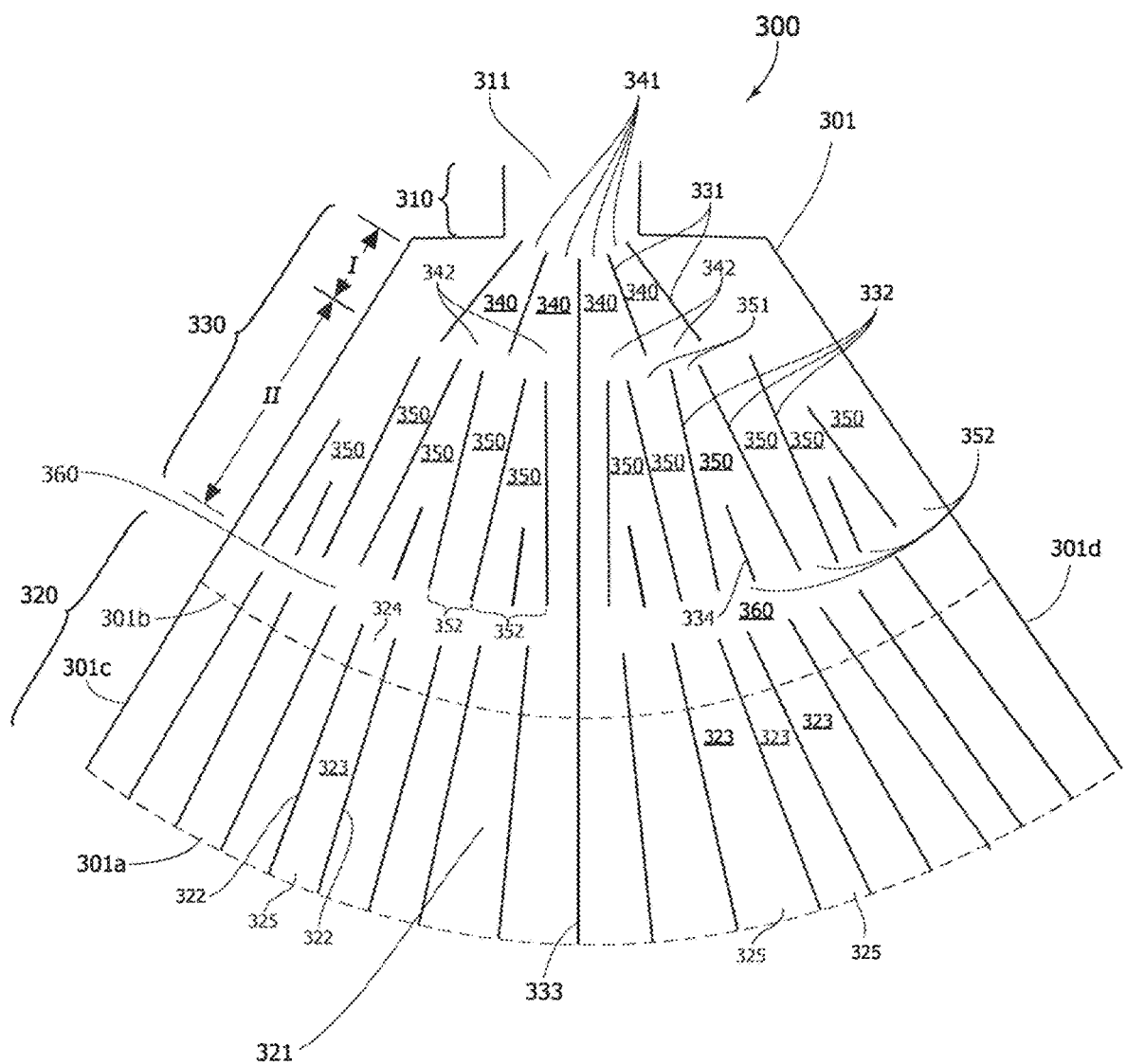

FIG. 3 shows a top elevation of a second embodiment of a distributor device 300 with an inlet portion 310 with an inlet 311 at a distal end of the distributor device 300, an outlet portion 320 with an outlet opening 321 at a proximal end of the distributor device 300, and a distributor portion 330 arranged between the inlet portion 310 and the outlet portion 320. The inlet portion 310 of the distributor device 300 is connectable to a powder supply tube for receiving a powder flow through a single inlet 311. Under operation, the powder flow is passed from the inlet portion 310 through the distributor portion 330 to the outlet portion 320 from where it is discharged through outlet opening 321 for delivery to a mould cavity of a powder compression die. The distributor device 300 has a box-shaped housing 301 having in a vertical direction a top wall 301a and a bottom wall 301b opposite of the top wall and, in a horizontal direction, a first side wall 301c and a second side wall 301d opposite of the first side wall 301c. The top and bottom walls 301a, 301b are essentially parallel to each other, here spaced apart from each other with a height essentially matching the height of the inlet 311. The first and second side walls 301c, 301d are arranged at an angle with respect to each other so as to diverge in a direction from the inlet 311 to the outlet 321. The outlet opening 321 has a width which determines the width of a mould cavity that can reliable be filled by a filling shoe with a distributor device 300, i.e. the width of the outlet opening 321 matches or surpasses the width of a cavity to be filled.

The distributor portion 330 has a plurality of guide elements 331, 332 forming distributor channels 340, 350, each distributor channel 340, 350 having an input 341, 351 with a corresponding input cross-sectional area and an output 342, 352 with a corresponding cross-sectional area. The top view of FIG. 3 illustrates the arrangement of the guide elements 331, 332 in the distributor portion 330. The guide elements 331, 332 are arranged in a cascading arrangement of consecutive stages I, II with a first stage I of guide elements 331 forming first distributor channels 340 at an upstream end of the distributor portion 330, and a second stage II of guide elements 332 forming second distributor channels 342 downstream stream of the first stage I and extending towards the downstream end of the distributor portion 330. Thereby, a uniform distribution of the powder flow across the width of the distributor device 300 is obtained at the outputs 352 of the second stage II distributor channels 350.

The outputs 352 of the second stage II distributor channels 350 yield into distribution ducts 360 arranged transversely of the powder flow. The distribution ducts 360 form a reservoir for the collection of powder. The distribution ducts 360 are thus adapted to collect the powder from the outputs 352 of the second stage distributor channels 350. The collected powder is then passed on to the outlet portion 320.

The outlet portion 320 comprises separation walls 322 dividing the outlet opening 321 in a plurality of outlet channels 323 closely abutting each other in a horizontal direction. The outlet channels 323 each have an input 324 connected to the distribution duct 360. The outlet channels 323 are thus arranged to receive powder from the distribution duct 360 of distributor portion 330, wherein the distribution duct 360 evenly distributes the powder supply to the outlet channels 323. The powder is then delivered through the outputs 325 at the outlet opening 321 with a uniform distribution of the powder pressure across the outlet opening 321.

The guide elements 331, 332, of the first and second stages I, II of the distributor portion 330 are arranged to redistribute the mass-flux of the powder flow in a similar manner as the distributor portion 230 discussed above with respect to FIG. 2. As a difference in the details of the arrangement of the guide elements 332, some of the distributor channels 350 of the second stage II of the distributor portion 330 actually converge in the direction of the flow so as to concentrate the mass flux at the output 352 as compared to the mass flux received at the input end 351. Nevertheless, the purpose of the guide element arrangement is still to equalize the powder flow over the transverse cross-section of the distributor device.

The first stage of distributor channels 340 of the particular embodiment shown in FIG. 3 contains four guide elements 331, which in combination with the housing walls 301a-301d and a central division wall 333 form six first stage distributor channels 340 with an input 341 at the inlet portion 310, and an output 342 downstream thereof. The second stage counts twelve guide elements 332, which, in combination with the housing walls 301a-301d and the central division wall 333, form fourteen second stage distributor channels 350 with inputs 351 arranged immediately at the outputs 342 of the first stage distributor channels 340. The second stage further comprises six additional guide elements 334 arranged in the output of some of the second stage distributor channels 350 for subdividing the output flow of these expanding channels. The particular embodiment shown in FIG. 3 further has sixteen essentially equally spaced separation walls 322, which in combination with the housing walls 301a-d and the central division wall 333 form eighteen outlet channels 323, each with an input 324 connected to the distribution duct 360 of the distributor portion 330, and an output 325 downstream thereof at the outlet opening 321.

Figure 4:
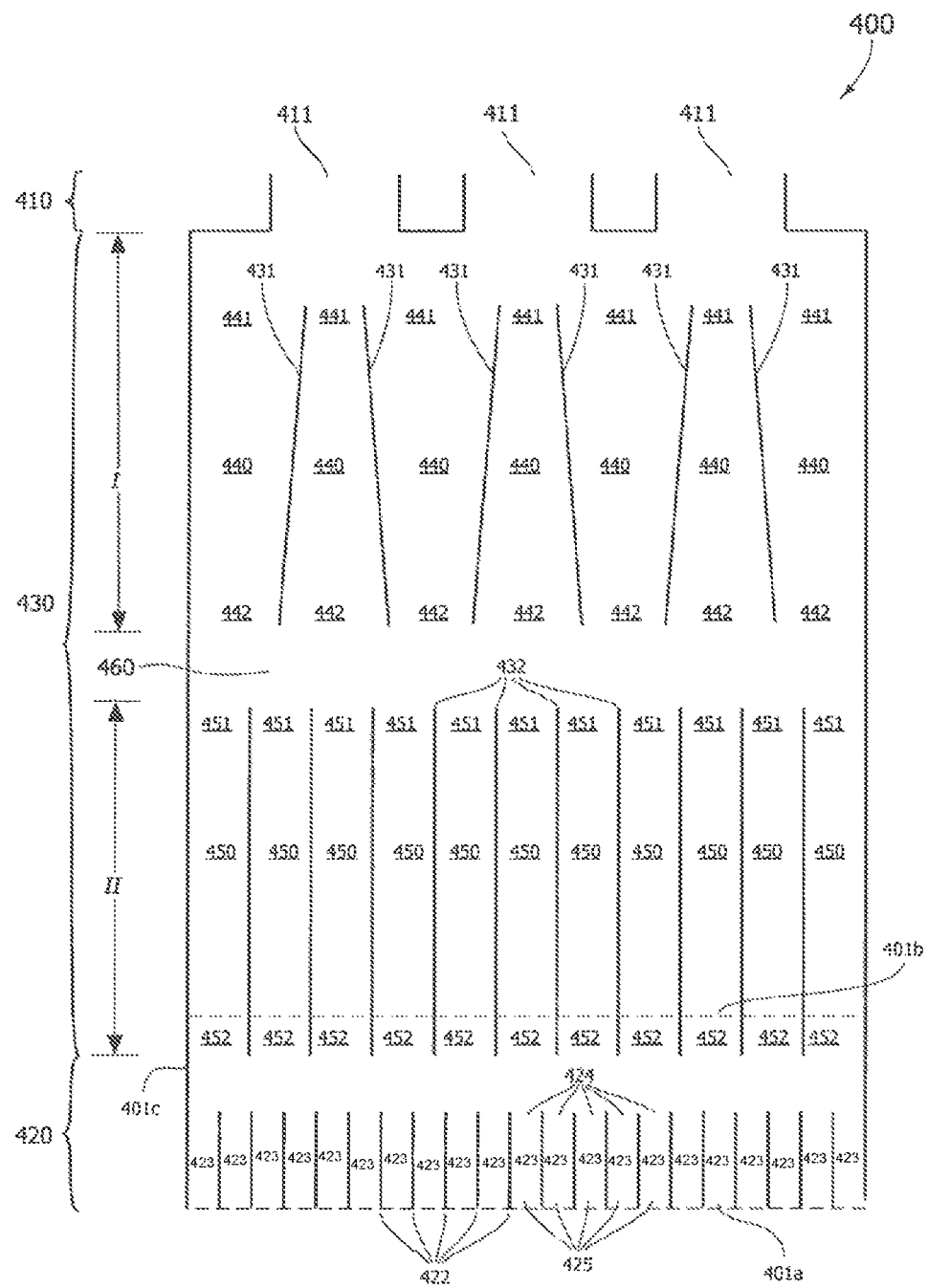

FIG. 4 shows a top elevation of a third embodiment of a distributor device 400 with an inlet portion 410 with three inlets 411 at a distal end of the distributor device 400, an outlet portion 420 with an outlet opening 421 at a proximal end of the distributor device 400, and a distributor portion 430 arranged between the inlet portion 410 and the outlet portion 420. The inlet portion 410 of the distributor device 400 is connectable to a powder supply tube for receiving a powder flow through the three inlets 411. Under operation, the powder flow is passed from the inlet portion 410 through the distributor portion 430 to the outlet portion 420 from where it is discharged through outlet opening 421 for delivery to a mould cavity of a powder compression die. The distributor device 400 has a box-shaped housing 401 having in a vertical direction a top wall 401a and a bottom wall 401b opposite the top wall and, in a horizontal direction, a first side wall 401c and a second side wall 401d opposite of the first side wall 401c. The top and bottom walls 401a, 401b are essentially parallel to each other, here spaced apart from each other with a height essentially matching the height of the inlets 411. The first and second side walls 401c, 401d are also arranged essentially parallel to each other and are spaced apart from each other at a distance defining the width of the distributor device 400. The three inlets 411 at the inlet portion 410 are arranged in a row distributed over the width of the distributor device 400. The outlet opening 421 has a width which determines the width of a mould cavity that can reliable be filled by the distributor device 400, i.e. the width of the outlet opening 421 matches or surpasses the width of a cavity to be filled.

The distributor portion 430 has a plurality of guide elements 431, 432 forming distributor channels 440, 450, each distributor channel 440, 450 having an input 441, 451 with a corresponding input cross-sectional area and an output 442, 452 with a corresponding cross-sectional area. The top view of FIG. 4 illustrates the arrangement of the guide elements 431, 432 in the distributor portion 430. The guide elements 431, 432 are arranged in a cascading arrangement of consecutive stages I, II with a first stage I of guide elements 431 forming first distributor channels 440 at an upstream end of the distributor portion 430, and a second stage II of guide elements 432 forming second distributor channels 442 downstream stream of the first stage I and extending towards the downstream end of the distributor portion 430.

In contrast to the embodiments of FIG. 2 and FIG. 3, in the embodiment of FIG. 4 the first and second stages I, II are separated from each other by a distribution duct 460 arranged transversely of the distributor channels 440, 450 and the corresponding powder flow. The distribution duct 460 is connected to the first stage I distributor channels 440 so as to receive powder flows from the outputs 442. The distribution duct 460 is further connected to the second stage II distributor channels 450 so as to supply powder to the inputs 451. The distribution duct 460 forms a reservoir for the collection of powder. The distribution duct 460 is thus adapted to collect the powder from the outputs 342 of the first stage I distributor channels 440. The collected powder is then passed on to the second stage II of the distributor portion 420.

The second stage II distributor channels 450 are thus arranged to receive powder from the distribution duct 460 of distributor portion 430, wherein the distribution duct 460 evenly distributes the powder supply to the second stage II distributor channels 450. The powder is then passed on through the outputs 452 to the outlet portion 420 with a uniform distribution of the powder. The outlet portion 420 comprises separation walls 422 dividing the outlet opening 421 in a plurality of outlet channels 423 closely abutting each other in a horizontal direction. The outlet channels 423 each have an input 424 at the upstream end of the outlet portion 420 and an output 425 at a downstream end of the outlet portion 420. The outputs 452 of the second stage II distributor channels 450 and the inputs 424 of the outlet channels 423 may be separated by a spacing acting as a further distribution duct much in the same way as the distribution ducts of the embodiment of FIG. 3. The outlet channels 423 are thus arranged to receive powder from the distribution portion 430 through the further distribution duct that ensures an even distribution of the powder supplied to the outlet channels 423. The powder is then delivered through the outputs 425 at the outlet opening 421 with a uniform distribution of the powder pressure across the outlet opening 421.

The guide elements 431 of the first stage I of the distributor portion 430 form both expanding distributor channels 440 where an output cross-sectional area is larger than the corresponding input cross-sectional area and converging distributor channels 440 where an output cross-sectional area is smaller than the corresponding input cross-sectional area. The expanding first stage I distributor channels 440 are aligned with centre portions of the inlets 411, whereas the converging first stage I distributor channels collect powder flow from the fringes of the inlets 411. This configuration compensates for the fact that a central fraction of the powder flow received at each of the three inlets 411, e.g. through a tube of essentially circular cross-section, carries a larger amount of powder than edge fractions towards the sides of the inlets 411. The larger mass flux at the centre is therefore expanded, whereas the mass flux collected from the fringe portions is concentrated, thereby redistributing the mass flux in a transverse (horizontal) direction of the distributor device conduit 401 so as to equalize the powder flow in a transverse (horizontal) direction. In the particular configuration of the embodiment shown in FIG. 4, the first stage I has six guide elements 431, which in combination with the housing 401 form eight first stage I distributor channels 440. The distribution duct 460 does not have any guide elements. The second stage II has eight guide elements 432, which in combination with the housing 401 and further guide elements 433 arranged at the sides form 9 second stage II distribution channels 450. The outlet portion 420 twenty essentially equally spaced separation walls 422, which in combination with the housing 401 form twenty-one outlet channels 423.

EXAMPLE

The following tables show comparative data from a production of 30 compressed green parts using identical powder material and applied compression pressure (700 Mpa) for all parts: 15 test parts were produced using a traditional filling method with 3 hoses feeding into a filling shoe forming the powder outlet for filling the mould cavity ("GAMMAL"); and further 15 test parts were produced using a filling shoe with a distributor device according to one embodiment of the invention ("NY") The distributor device used in the filling shoe for the second set of test parts ("NY") corresponds to the distributor device 200 according to the first embodiment shown in FIG. 2. All parts were produced from the same mould, and are therefore nominally identical. The thickness of the produced parts, a gear wheel, was then measured at four test points ('front', 'back', 'left', 'right') and the maximum difference between measured thickness values was determined for each part. A significantly reduced variation in the thickness was observed for the parts produced according to the invention (0.052 mm) as compared to the traditional method (0.092 mm) as evident from the following tables.

TABLE 1

"GAMMAL" - parts produced using a traditional filling technique;

| Gammal part no | Height (mm) Gear 14 mm | | | | | |
|---|---|---|---|---|---|---|
| | front | left | back | right | average | max diff. |
| 1 | 14.215 | 14.246 | 14.188 | 14.295 | 14.236 | 0.107 |
| 2 | 14.197 | 14.241 | 14.179 | 14.263 | 14.220 | 0.084 |
| 3 | 14.216 | 14.251 | 14.165 | 14.261 | 14.223 | 0.096 |
| 4 | 14.209 | 14.25 | 14.184 | 14.285 | 14.232 | 0.101 |

TABLE 1-continued

"GAMMAL" - parts produced using a traditional filling technique;

| Gammal part no | Height (mm) Gear 14 mm | | | | | |
|---|---|---|---|---|---|---|
| | front | left | back | right | average | max diff. |
| 5 | 14.228 | 14.228 | 14.18 | 14.3 | 14.234 | 0.12 |
| 6 | 14.207 | 14.232 | 14.186 | 14.28 | 14.226 | 0.094 |
| 7 | 14.207 | 14.215 | 14.169 | 14.275 | 14.217 | 0.106 |
| 8 | 14.204 | 14.25 | 14.161 | 14.245 | 14.215 | 0.089 |
| 9 | 14.203 | 14.267 | 14.218 | 14.268 | 14.239 | 0.065 |
| 10 | 14.214 | 14.228 | 14.189 | 14.306 | 14.234 | 0.117 |
| 11 | 14.185 | 14.225 | 14.154 | 14.225 | 14.197 | 0.071 |
| 12 | 14.189 | 14.239 | 14.175 | 14.247 | 14.213 | 0.072 |
| 13 | 14.203 | 14.273 | 14.181 | 14.244 | 14.225 | 0.092 |
| 14 | 14.213 | 14.24 | 14.195 | 14.29 | 14.235 | 0.095 |
| 15 | 14.19 | 14.214 | 14.172 | 14.247 | 14.206 | 0.075 |
| Average | 14.205 | 14.240 | 14.180 | 14.269 | 14.223 | 0.092 |

TABLE 2

"NY" - parts produced using a distributor device according to the invention;

| Ny part no | Height (mm) Gear 14 mm | | | | | |
|---|---|---|---|---|---|---|
| | front | left | back | right | average | max diff. |
| 1 | 14.158 | 14.149 | 14.197 | 14.152 | 14.164 | 0.048 |
| 2 | 14.145 | 14.146 | 14.205 | 14.138 | 14.159 | 0.067 |
| 3 | 14.123 | 14.136 | 14.208 | 14.166 | 14.158 | 0.085 |
| 4 | 14.147 | 14.142 | 14.16 | 14.145 | 14.149 | 0.018 |
| 5 | 14.124 | 14.121 | 14.19 | 14.148 | 14.146 | 0.069 |
| 6 | 14.124 | 14.141 | 14.202 | 14.141 | 14.152 | 0.078 |
| 7 | 14.131 | 14.113 | 14.184 | 14.15 | 14.145 | 0.071 |
| 8 | 14.155 | 14.14 | 14.183 | 14.186 | 14.166 | 0.046 |
| 9 | 14.161 | 14.151 | 14.172 | 14.147 | 14.158 | 0.025 |
| 10 | 14.117 | 14.114 | 14.16 | 14.147 | 14.135 | 0.046 |
| 11 | 14.116 | 14.174 | 14.161 | 14.155 | 14.152 | 0.058 |
| 12 | 14.175 | 14.157 | 14.179 | 14.159 | 14.168 | 0.022 |
| 13 | 14.138 | 14.127 | 14.172 | 14.146 | 14.146 | 0.045 |
| 14 | 14.125 | 14.143 | 14.159 | 14.132 | 14.140 | 0.034 |
| 15 | 14.136 | 14.149 | 14.207 | 14.171 | 14.166 | 0.071 |
| Average | 14.138 | 14.140 | 14.183 | 14.152 | 14.153 | 0.052 |

The invention claimed is:

1. A distributor device for use in a filling shoe for filling a mould cavity of a powder compression die, the distributor device comprising a housing adapted to direct a powder flow from a powder supply to an outlet of the filling shoe for discharge into the mould cavity, the housing comprising:
   an inlet portion connectable to the powder supply;
   an outlet portion with an outlet opening arranged at the outlet of the filling shoe; and
   a distributor portion arranged between the inlet portion and the outlet portion, wherein the distributor portion comprises two or more guide elements arranged to divide the distributor portion into a plurality of distributor channels including at least three side-by-side distributor channels, each distributor channel having an input with an input cross-sectional area at an upstream end of the distributor channel and an output with an output cross-sectional area at a downstream end of the distributor channel, wherein the input cross-sectional area is larger than the output cross-sectional area for at least one of the distributor channels so as to expand a transverse extension of a sub-flow along the direction of powder flow so as to reduce a mass flux of the sub-flow at the outlet portion with respect to a mass flux of said at least one sub-flow at the inlet portion, wherein the distributor channels are disposed in a cascaded arrangement of consecutive stages, and wherein the outlet portion comprises separation walls dividing the outlet opening into outlet channels.

2. Distributor device according to claim 1, wherein the guide elements are arranged to define a first stage with a first number of N distributor channels and a consecutive second stage with a second number of M distributor channels arranged downstream of the first stage, wherein a first channel of the first number of N distributor channels is defined by at least one first wall surface, a second channel of the first number of N distributor channels is defined by at least one second wall surface, and the first and second wall surfaces are parallel to one another, wherein a third channel of the second number of M distributor channels is defined by at least one third wall surface, a fourth channel of the second number of M distributor channels is defined by at least one fourth wall surface, and the third and fourth wall surfaces are parallel to one another, and wherein the first number is different from the second number.

3. Distributor device according to claim 1, wherein each distributor channel has an input/output ratio defined as the input cross-sectional area divided by the output cross-sectional area, wherein the input/output ratio for at least one of the distributor channels differs from the input/output ratio of one or more of the remaining distributor channels.

4. Distributor device according to claim 1, further comprising one or more distribution ducts, each distribution duct being adapted to receive powder from a plurality of distributor channels upstream thereof and to distribute the collected powder to a plurality of channels downstream thereof.

5. Distributor device according to claim 4, wherein at least one distribution duct is arranged between a first stage of the distributor portion and a second stage of the distributor portion.

6. Distributor device according to claim 4, wherein the distributor channels of the second stage have equal length and/or equal input/output ratio.

7. Distributor device according to claim 4, wherein at least one distribution duct is arranged between the distributor portion and the outlet portion.

8. Distributor device according to claim 1, wherein the outlet opening has a width that is equal or larger than the mould cavity to be filled.

9. Distributor device according to claim 1, wherein a cross-sectional area defined by an outermost periphery of the outlet opening is larger than a cross-sectional area defined by an outermost periphery of the inlet.

* * * * *